United States Patent
Kwampian et al.

(10) Patent No.: US 9,631,073 B2
(45) Date of Patent: Apr. 25, 2017

(54) POLYMER COMPOSITIONS OR BLENDS INCLUDING NATURAL RUBBER-BASED ACRYLONITRILE BUTADIENE STYRENE

(75) Inventors: Suthep Kwampian, Muang Rayong (TH); Ronnapa Phonthong, Muang Rayong (TH); Worawan Laptaptimthong, Muang Rayong (TH); Pichapob Karoonngampan, Muang Rayong (TH)

(73) Assignee: IRPC PUBLIC COMPANY LIMITED, Muang, Rayong (TH)

( * ) Notice: Subject to any disclaimer, the term of this patent is extended or adjusted under 35 U.S.C. 154(b) by 0 days.

(21) Appl. No.: 14/386,840

(22) PCT Filed: Mar. 22, 2012

(86) PCT No.: PCT/TH2012/000012
§ 371 (c)(1),
(2), (4) Date: Dec. 11, 2014

(87) PCT Pub. No.: WO2013/141822
PCT Pub. Date: Sep. 26, 2013

(65) Prior Publication Data
US 2015/0307694 A1    Oct. 29, 2015

(51) Int. Cl.
*C08L 7/02* (2006.01)
*C08L 55/02* (2006.01)
*C08L 69/00* (2006.01)
*C08J 3/00* (2006.01)
*C08J 3/22* (2006.01)
*C08J 3/26* (2006.01)

(52) U.S. Cl.
CPC ............. *C08L 7/02* (2013.01); *C08J 3/005* (2013.01); *C08J 3/22* (2013.01); *C08J 3/26* (2013.01); *C08L 55/02* (2013.01); *C08L 69/00* (2013.01); C08J 2307/02 (2013.01); C08J 2369/00 (2013.01); C08J 2451/04 (2013.01); C08J 2455/02 (2013.01); C08L 2201/52 (2013.01); C08L 2205/025 (2013.01); C08L 2205/035 (2013.01); C08L 2310/00 (2013.01)

(58) Field of Classification Search
CPC ............... C08L 7/02; C08L 55/02; C08J 3/22
USPC ........................................................ 523/351
See application file for complete search history.

(56) References Cited

U.S. PATENT DOCUMENTS

| | | | | |
|---|---|---|---|---|
| 4,690,975 A | * | 9/1987 | Sugimori | ................. C08J 3/005 525/100 |
| 2007/0072995 A1 | * | 3/2007 | Kang | .................. C08L 23/0869 525/92 E |
| 2008/0182926 A1 | * | 7/2008 | Lim | ....................... C08F 279/02 524/97 |
| 2010/0216922 A1 | * | 8/2010 | Lee | .......................... C08L 69/00 524/117 |

FOREIGN PATENT DOCUMENTS

| | | |
|---|---|---|
| JP | 06263962 A | 9/1994 |
| JP | 2010111738 A | 5/2010 |
| JP | 2011089066 A | 5/2011 |
| JP | 2011225791 A | 11/2011 |
| JP | 2011246514 A | 12/2011 |
| WO | 2008004686 A1 | 1/2008 |

* cited by examiner

*Primary Examiner* — Dori Lee
(74) *Attorney, Agent, or Firm* — Novick, Kim & Lee, PLLC; Jae Youn Kim

(57) ABSTRACT

In an embodiment, a natural rubber-based ABS—target polymer blend includes natural rubber-based ABS powder combined with a set of target polymers (e.g., polycarbonate (PC)). A natural rubber-based ABS powder production process includes producing grafted natural rubber; and mixing the grafted natural rubber with a set of grafted polybutadiene rubbers. The set of grafted polybutadiene rubbers includes at least one grafted polybutadiene rubber having a particle size that is significantly different than the grafted natural rubber particle size. In an embodiment, the grafted natural rubber exhibits a large particle size; a first grafted polybutadiene rubber exhibits a small particle size; and a second grafted polybutadiene rubber exhibits a medium particle size between the large and small particle sizes. Natural rubber-based ABS—target polymer blends in accordance with the present disclosure can exhibit generally equivalent or increased impact and/or tensile strength compared to other non-natural or synthetic rubber-based ABS blends.

16 Claims, No Drawings

POLYMER COMPOSITIONS OR BLENDS INCLUDING NATURAL RUBBER-BASED ACRYLONITRILE BUTADIENE STYRENE

TECHNICAL FIELD

The present disclosure relates generally to compositions that include natural rubber-based acrylonitrile butadiene styrene (ABS) and one or more other polymers, for instance, compositions such as polycarbonate (PC)—natural rubber-based ABS blends.

BACKGROUND

PC/ABS compositions are typically known for their high ductility at room temperature and low temperatures, as well as good processing properties. Thermoplastic resins made from PC/ABS compositions are useful and are widely used in products such as automotive body parts, electrical appliances, stationery, electrical cables and kitchen appliances.

There are several different methods, processes and techniques for preparing or producing products which include ABS as a component. However, there are certain disadvantages associated with these existing methods, processes and techniques. In particular, the use of polybutadiene in conventional methods of producing ABS blends has adverse effects on the environment. This is mainly due to the large quantities of chemical pollutants that are produced during the process of synthesizing polybutadiene. Furthermore, synthesizing polybutadiene involves high production costs, which stem from high material, apparatus, and manpower costs.

Impact modifiers are commonly added to PC/ABS compositions to improve the toughness of the compositions. Impact-modified PC/Abs compositions are described generally, for example, in US. Pat. Ser. No. 3,130,177. However, many impact modifiers may also adversely affect other properties such as processability, heat stability, tensile strength and/or low temperature impact strength.

Hence, there is a need for an environmentally-friendly alternative to current ABS blends, which exhibits appropriate, desirable, or improved physical properties such as impact strength and/or tensile strength, and which avoids significantly adversely affecting other desirable composition properties.

SUMMARY

Certain aspects of the present disclosure address or overcome the aforementioned problems and/or deficiencies commonly associated with existing ABS blends. Accordingly, provided and described herein are various embodiments of natural-rubber based ABS blends.

In accordance with an aspect of the present disclosure, there is provided a natural-rubber based ABS blend that includes natural rubber-based ABS and at least one target polymer with which the natural rubber-based ABS can be combined. Particular aspects of the present disclosure are directed to a natural rubber-based ABS/PC thermoplastic resin. Such a thermoplastic resin includes natural rubber-based ABS powder; polycarbonate (PC); copolymer of styrene and acrylonitrile; and a plurality of additives including at least ethylene-bis-stearamide, calcium stearate and silicone oil lubricant; wherein the natural rubber-based ABS powder is produced by mixing a crosslinking agent such as divinylbenzene (DVB) with a portion of natural rubber to produce vulcanized natural rubber; mixing the vulcanized natural rubber with a monomer solution to produce grafted natural rubber; mixing a plurality of grafted polybutadiene rubbers with the grafted natural rubber to produce a latex masterbatch; and mixing a coagulant with a portion of the latex masterbatch to produce a natural rubber-based ABS powder. The natural rubber-based ABS powder can be combined with PC in one or more manners to produce various types of natural rubber-based ABS/PC products.

In accordance with an aspect of the disclosure, a process for producing a polymer composition including natural rubber-based acrylonitrile butadiene styrene (ABS) includes mixing a crosslinking agent with a portion of natural rubber to produce vulcanized natural rubber; mixing the vulcanized natural rubber with a monomer solution to produce grafted natural rubber having a grafted natural rubber particle size; and mixing the grafted natural rubber with a set of grafted polybutadiene rubbers to produce a latex masterbatch, the set of grafted polybutadiene rubbers comprising at least one grafted polybutadiene rubber having a particle size that is significantly different than the grafted natural rubber particle size.

The set of grafted polybutadiene rubbers can include a first grafted polybutadiene rubber having a first grafted polybutadiene rubber particle size, and a second grafted polybutadiene rubber having a second grafted polybutadiene rubber particle size. For instance, the grafted natural rubber particle size can correspond to a large particle size; the first grafted polybutadiene rubber can correspond to a small particle size; and the second grafted polybutadiene rubber can correspond to a medium particle size intermediate between the large particle size and the small particle size.

The large particle size, the small particle size, and the medium particle size are significantly different or readily distinguishable from the other. For instance, the small particle size can be between approximately 20% and 90% smaller than the large particle size; and the medium particle size can exceed the small particle size by between approximately 15% and 85% of a difference between the large particle size and the small particle size. In a representative implementation, the large particle size is between approximately 0.7 and 1.1 microns, the small particle size is between approximately 0.15 and 0.25 microns, and the medium particle size is between approximately 0.35 and 0.45 microns.

In accordance with a further aspect of the disclosure, a process includes producing natural rubber-based ABS powder from a latex masterbatch; and combining such natural rubber-based ABS powder with a set of target polymers to produce a natural rubber-based ABS/target polymer blend. A set of target polymers can include polycarbonate, nylon, polybutylene terephthalate (PBT), polymethyl methacrylate (PMMA), and polyethylene terephthalate (PET), and/or other polymers (e.g., additional or other synthetic polymers).

Combining the natural rubber-based. ABS powder with the set of target polymers can include mixing the natural rubber-based ABS powder with the set of target polymers in a compounding reactor, such as an extruder, and forming a plastic product or plastic product precursor that includes the natural rubber-based ABS/target polymer blend.

In addition to providing a more environmentally-friendly production process, it is also found that thermoplastic resins in accordance with embodiments of the present disclosure exhibit generally equivalent or increased impact strength and/or tensile strength compared to other non-natural or synthetic rubber-based ABS blends, such as conventional PC/ABS blends.

DETAILED DESCRIPTION

In the context of the present disclosure, the term "set" corresponds to or is defined as a non-empty finite organization of elements that mathematically exhibits a cardinality of at least 1 (i.e., a set as defined herein can correspond to a singlet or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)). In accordance with an aspect of the present disclosure, an element of a representative set can include or be a material or chemical compound, component, or constituent; a property or characteristic of a material or chemical compound, component, or constituent; a process portion; or a value.

Particular polymer compositions, blends, resins, or products (e.g., thermoplastic products) in accordance with an embodiment of the present disclosure include natural rubber-based ABS, as well as one or more additional polymer components or constituents (e.g., polycarbonate). As a precursor to the formation of a natural rubber-based ABS-polymer blend or product, natural rubber-based ABS in accordance with an embodiment of the present disclosure can exist in a powder form, as further detailed below.

Compositions in accordance with an embodiment of the disclosure can also include one or more additional constituents, such as one or more of ethylene-bis-stearamide, silicone (EBS), and calcium-sterate (Ca-st). While particular representative embodiments of the disclosure are described herein with respect to polycarbonate—natural rubber-based ABS blends, other compositions that include one or more other or additional polymers blended with natural rubber-based ABS are also encompassed by embodiments in accordance with the present disclosure as well as the claims set forth below.

Natural rubber-based ABS powders in accordance with embodiments of the present disclosure can substantially reduce adverse environmental impact. This is primarily attributed to the use of natural rubber and avoiding the use of synthetic rubber(s) associated with undesirable or large quantities of chemical pollutants (e.g., which are associated with a synthetic rubber manufacturing process). In multiple embodiments of this disclosure, the natural rubber requires no or essentially no processing prior to a vulcanization process. This results in lower production costs and reduces the output of chemical pollutants. Furthermore, natural rubber-based ABS powders provided by various embodiments of this disclosure have very good, good or relatively good compatibility with other polymers and/or plastic compounds, compositions or materials, such as, but not limited to, nylon, polybutylene terephthalate (PBT), polymethyl methacrylate (PMMA), and polyethylene terephthalate (PET).

A process in accordance with some embodiments of the disclosure includes a vulcanization process which involves a mixing a crosslinking agent such as divinylbenzene (DVB) with natural rubber to produce vulcanized natural rubber. A polymerization process follows the vulcanization process, where the polymerization process involves the use of styrene and acrylonitrile to produce a raw natural rubber-based ABS powder. By using an appropriate crosslinking agent such as DVB during the vulcanization process, the vulcanized rubber produced is substantially in a liquid form which can exist as a liquid solution, suspension or emulsion. Resultantly, an intermediate step which is required in conventional methods before the polymerization process can be eliminated. Following the polymerization process, a flocculation process or reaction follows to thereby produce a natural rubber-based ABS powder as a component.

The vulcanization process involves mixing, interacting, reacting, combining, joining or blending a portion of a mixture of a plurality of emulsifiers and a catalyst with natural rubber, a crosslinking agent and at least one deoxidant. The vulcanization process facilitates the formation of an intermediate product or more specifically, vulcanized natural rubber.

In a successive polymerization process, the vulcanized rubber is mixed with a stabilizer, at least one deoxidant, a monomer solution of styrene and acrylonitrile, a transfer agent, a catalyst solution and an emulsifier solution in a reactor. The polymerization process can produce, yield, harvest or give rise to grafted natural rubber.

The flocculation process includes producing, harvesting or yielding a latex masterbatch, and mixing a portion of the latex masterbatch with a coagulant and water to produce, harvest or yield raw natural rubber-based ABS powder. Subsequent process portions associated with flocculation include filtration and drying to produce, yield, harvest or give rise to a natural rubber-based ABS' composition or component in accordance with embodiments of the disclosure, for instance, a natural rubber-based ABS powder. The natural rubber-based ABS powder can be in solid state form, for example, powder form. Therefore, the natural rubber-based ABS powder can be readily combined or easily mixed with other plastic or polymer compositions such as polymer or plastic based powders for manufacturing or producing plastic products. Accordingly, there can be good uniformity or homogeneity achieved or established between a natural rubber-based ABS powder in accordance with embodiments of the disclosure and other common plastic or plastic-based powders. This facilitates or allows the natural rubber-based ABS powder to be used, combined, applied with, and/or at least partially substituted for existing plastic or plastic powders.

Following the flocculation process, the natural rubber-based ABS powder can undergo a compounding process involving one or more other polymers to eventually produce, yield, harvest or give rise to natural rubber-based polymer blends, such as ABS/PC blends or thermoplastic products. The use of a natural rubber-based ABS composition such as a natural rubber-based ABS powder provided by multiple embodiments of this disclosure can produce, yield or give rise to ABS/PC or other natural rubber-based ABS/target polymer compositions, blends, or products that exhibit increased mechanical strength and/or enhanced physical properties relative to conventional polymer blends that lack or exclude natural rubber-based ABS.

Representative embodiments of the disclosure are directed to methods, processes and/or techniques for preparing, producing, and/or manufacturing natural rubber-based ABS-polymer blends or products (e.g., PC thermoplastic products) are described in detail hereinafter. This, however, does not preclude various embodiments of the disclosure from other applications where fundamental principles prevalent among the various embodiments of the disclosure such as operational, functional, or performance characteristics are desired or required.

Aspects of a Representative Vulcanization Process

Natural rubber does not have any crosslinks and is physically soft and weak relative to synthetic rubbers such as polybutadiene. In accordance with several embodiments of the present disclosure, a crosslinking or vulcanization process 110 involving natural rubber is first performed. As will be understood by a person of ordinary skill in the art, vulcanization processes are commonly associated with strengthening and/or enforcing the tensile and/or physical strength of rubber, for example, natural rubber. Specifically, vulcanization is a process by which rubber molecules are crosslinked with each other for strengthening the physical properties of rubber. In particular, crosslinking increases the elasticity and the strength of rubber by about ten-fold.

Conventional methods of vulcanizing rubber involve heating liquid rubber with sulphur or sulphur containing compounds. Examples of such practices are described in, *Handbook of Plastic Elastomer & Composites* ($4^{th}$ Edition. Edited by Charles A. Harper and published by The Mc Graw-Hill Companies) and *Advanced Rubber Composites* (Edited by G. Heinrich and published by Springer). The sulphur or sulphur containing compounds are used as crosslinking agents or vulcanizing agents. However, in several embodiments of this disclosure, divinylbenzene (DVB) is used as a crosslinking or vulcanizing agent. The use of DVB as a crosslinking or vulcanizing agent produces, harvests or yields vulcanized natural rubber which is substantially in liquid form which can exist as a liquid solution, suspension or emulsion. This eliminates the need for an intermediate step before a polymerization process 120. By using DVB as a crosslinking or vulcanizing agent, the product as a result of the vulcanization process, for example vulcanized natural rubber, can be used directly in a subsequent polymerization process 120. This circumvents the need or requirement to have an additional process before the polymerization process 120. Additionally or alternatively, an organic peroxide, for instance, diacyl peroxylester, dialkyl peroxylester, and/or a peroxyketal such as DCP, 2,5-dimethyl-2,5-di(t-butylperoxy), can be used as a crosslinking agent.

A vulcanization process 110 in accordance with the present disclosure can use a number or set of different starting materials, reagents or reactants. In multiple embodiments, the set of starting materials, reagents and/or reactants include natural rubber, a plurality of emulsifiers, a catalyst, at least one deoxidant and a crosslinking agent. In the following discussion on vulcanization, the quantities of the set of starting materials, reagents and/or reactants including natural rubber, a plurality of emulsifiers, a catalyst, at least one deoxidant and a crosslinking agent are expressed in parts by weight relative to pre-vulcanized natural rubber.

In some embodiments, a plurality of emulsifiers including potassium hydroxide (KOH) and oleic acid can be used during the vulcanization process 110. Additionally, organic peroxides such as tert-Butyl hydroperoxide (TBHP) can be used as a catalyst in the vulcanization process 110. Further, a crosslinking agent such as divinylbenzene (DVB) can be used. The at least one deoxidant includes at least one of lactose, hepta hydrated iron sulphate ($FeSO_4.7H_2O$) and tetra sodium pyrophosphate (TSPP).

In various embodiments, the number or set of starting materials, reagents or reactants include between approximately 90 and 100 parts by weight, for example, approximately 100 parts by weight of natural rubber; between approximately 0.1 and 0.4 parts by weight, for example, approximately 0.2 parts by weight of KOH; between approximately 0.5 and 2 parts by weight, for example, approximately 0.85 parts by weight of oleic acid; between approximately 1 and 3 parts by weight, for example, approximately 2 parts by weight of TBHP; between approximately 0.1 and 1 parts by weight, for example, 0.5 parts by weight of DVB; between approximately 0.07 and 0.42 parts by weight, for example, 0.28 parts by weight of lactose; between approximately 0.001 and 0.006 parts by weight, for example, 0.004 parts by weight of $FeSO_4.7H_2O$; and between approximately 0.04 and 0.24 parts by weight, for example, 0.16 parts by weight of TSPP.

Depending upon embodiment details, the relative quantities and/or concentrations of the starting material(s), reagent(s) and/or reactant(s) can be varied. For instance, the molecular ratio of the emulsifiers, catalysts, at least one deoxidant and/or crosslinking agents can be varied according to a desired or target strength or expected strength of vulcanized natural rubber.

The vulcanization process 110 can be carried out, conducted or performed in a reactor, for instance, a 20-liter reactor. However, it should be understood by an ordinary person skilled in the art that other reactors of different volumes, shapes and/or sizes can also be used for the vulcanization process.

The vulcanization process 110 can include increasing, altering and/or maintaining the temperature of the vulcanization reactor, which can be by way of a heating system in a manner understood by one of ordinary skill in the relevant art (e.g., involving resistive, radiative, convective, immersive, or microwave heating elements, or heating furnaces, heat jackets or any other heating equipment known in the art for increasing, altering and/or maintaining the temperature of the reactor).

In various embodiments, a mixture of a plurality of emulsifiers and a catalyst is prepared or produced. A plurality of emulsifiers including KOH and oleic acid are mixed to form an emulsion mixture before a catalyst such as TBHP is added to the emulsion mixture to form an emulsifier-catalyst mixture. A first portion of the emulsifier-catalyst mixture can be introduced into a vulcanization reactor, which is operating at room temperature or between approximately 20 and 30° C. The first portion of the emulsifier-catalyst can include approximately 5% of the total or final volume or amount prepared.

Natural rubber is then introduced into the vulcanization reactor. The natural rubber includes latex rubber and is substantially liquid in nature. Upon addition of the first portion of the emulsifier-catalyst mixture and natural rubber into the vulcanization reactor, the contents of the vulcanization reactor can be stirred to mix and/or homogenize such contents by way of a stirrer, a magnetic stirrer or agitator. Subsequently, a crosslinking agent including DVB and at least one deoxidant including at least one of $FeSO_4.7H_2O$ and TSPP are introduced into the vulcanization reactor and mixed. KOH and oleic acid, which were previously added as part of the emulsifier-catalyst mixture, serve to stabilize the mixture of DVB and natural rubber, and TBHP serves to expedite the vulcanization process 110. By introducing at least one deoxidant into the vulcanization reactor, the operating or reaction temperature of the vulcanization process 110 can be lowered, reduced or decreased.

Subsequent to the introduction of the at least one deoxidant, the vulcanization reactor temperature is increased or raised to between approximately 65 and 75° C., for example, between approximately 69 and 71° C. The temperature increase or increment can be carried out over a period of between approximately 25 and 35 minutes, for example, over a period of approximately 30 minutes.

When the temperature has been increased to approximately between 69 and 71° C., a second portion or the remaining portion of the total or final volume or amount of the aforementioned emulsifier-catalyst mixture, for example, 95% of a total or final volume or amount prepared, is introduced (e.g., gradually or progressively introduced) into the vulcanization reactor over a period of or on the order of approximately 1 hour. Upon complete introduction of the second or remaining portion the emulsifier-catalyst mixture in to the reactor, the reactor and/or the reactor contents are maintained in a substantially unchanging, consistent, or constant state or left alone for multiple hours, for instance, approximately 7 hours, for one of facilitating and effectuating completion of the vulcanization process 110.

In various embodiments, the first process portion or the vulcanization process 110 produces an intermediate product, more specifically, vulcanized natural rubber. The vulcanized natural rubber according to multiple embodiments of this disclosure is substantially liquid in nature and can exist as a liquid solution, suspension or emulsion. This is distinct from and unlike conventional techniques of vulcanizing rubber where the resultant vulcanized rubber is in solid form.

The present disclosure includes a polymerization process for manufacturing or producing natural rubber-based ABS powder (e.g., a final or resultant natural rubber-based ABS composition or product). The existence of the vulcanized natural rubber as a liquid solution, suspension or emulsion facilitates the following polymerization process 120 by eliminating an intermediate process prior to the polymerization process 120.

Aspects of a Representative Polymerization Process

Subsequently, a polymerization process 120 is performed. As will be understood by a person of ordinary skill in the art, during a polymerization process 120, monomer molecules react chemically to form polymeric chains. Polymeric chains can include one or more monomeric species. Graft polymerization is a process specifically catered to producing polymers in which side chains are structurally distinct from a main chain.

A number of different starting materials, reagents or reactants can be used in a polymerization process 120 in accordance with the present disclosure. In several embodiments, a set of starting materials, reagents and/or reactants includes vulcanized natural rubber, a stabilizer, at least one deoxidant, monomers, a transfer agent, a catalyst and a plurality of emulsifiers. In the following description, the quantities of the set of starting materials, reagents and/or reactants including vulcanized natural rubber, a stabilizer, at least one deoxidant, monomers, a transfer agent, a catalyst and a plurality of emulsifiers are expressed in parts by weight, relative to natural rubber grafted latex with styrene and acrylonitrile copolymer.

In various embodiments, a stabilizer including ammonium hydroxide ($NH_4OH$) is used in the polymerization process 120. The at least one deoxidant includes at least one of lactose, hepta hydrated iron sulphate ($FeSO_4.7H_2O$) and tetra sodium pyrophosphate (TSPP). In addition, monomers including styrene and acrylonitrile can be used in the polymerization process 120. The transfer agent used in the polymerization process 120 includes tert-dodecylmercaptan (TDM). The catalyst includes organic peroxide, for example tert-butyl hydroperoxide (TBHP). TBHP can be supplied as a 69-70% aqueous solution. The plurality of emulsifiers for the polymerization process 120 includes potassium hydroxide (KOH) and oleic acid.

In various embodiments, the number or set of starting materials, reagents or reactants include between approximately 50 and 70 parts by weight, for example, approximately 60 parts by weight, of the vulcanized natural rubber; between approximately 1 and 6% parts by weight, for example, approximately 3% parts by weight of ammonium hydroxide ($NH_4OH$); between approximately 0.2 and 0.4 parts by weight, for example, 0.3 parts by weight of lactose; between approximately 0.0005 and 0.0015 parts by weight, for example, 0.001 parts by weight of $FeSO_4.7H_2O$; between approximately 0.05 and 0.15 parts by weight, for example, 0.1 part by weight of TSPP; between approximately 25 and 35 parts by weight, for example, 30 parts by weight of styrene; between approximately 5 and 15 parts by weight, for example, 10 parts by weight of acrylonitrile; between approximately 0.1 and 0.3 parts by weight, for example, 0.2 parts by weight of TDM; between approximately 0.1 and 0.2 parts by weight, for example, 0.136 parts by weight of TBHP; between approximately 0.15 and 0.25 parts by weight, for example, 0.203 parts by weight of KOH; and between approximately 0.5 and 1.5 parts by weight, for example, 1.0 part by weight of oleic acid.

The polymerization process 120 can be carried out, conducted or performed in a reactor, for instance, a 20-liter reactor. However, it should be understood for an ordinary person skilled in the art that other reactors of different volumes, shapes and/or sizes can also be used for the polymerization process 120.

The polymerization process 120 can include increasing, altering and/or maintaining the temperature of the polymerization reactor, which can be by way of a heating system in a manner understood by one of ordinary skill in the relevant art, in a manner identical or analogous to that described above.

In representative embodiments, vulcanized natural rubber is introduced into a polymerization reactor, which is operating at room temperature, between approximately 20 and 30° C. The vulcanized natural rubber is substantially in liquid form and includes a liquid solution, suspension or emulsion. A stabilizer such as $NH_4OH$ is subsequently added into the polymerization reactor. The role of the stabilizer is to delay, impede or slow down degradation, for example, heat degradation of the vulcanized natural rubber so that an intermediate product can be formed before it degrades or significantly degrades.

After the addition or introduction of the stabilizer, the polymerization reactor temperature is increased or raised to between approximately 60 and 70° C., for example, between approximately 64 and 66° C. The temperature increase or increment can be carried out over a period of tens of minutes, for instance, between approximately 25 and 35 minutes (e.g., approximately 30 minutes).

When the temperature has been increased to and/or maintained at approximately between 64 and 66° C., at least one deoxidant including at least one of lactose, $FeSO_4.7H_2O$ and TSPP is introduced into the polymerization reactor. The at least one deoxidant play a role in lowering the operating temperature of the reaction. In various embodiments, the deoxidants can be added to the reactor in any order (i.e., is not necessary to add these deoxidants in a specific order). For example, in some embodiments, the lactose is introduced before $FeSO_4.7H_2O$ and then TSPP. In other embodiments, the $FeSO_4.7H_2O$ is introduced before lactose and TSPP.

Subsequently, a monomer solution of styrene and acrylonitrile is prepared. In some embodiments, a transfer agent such as TDM can be introduced to the monomer solution. Depending upon embodiment details, one or more organic solvents can be used with or added to the styrene and/or acrylonitrile and/or TDM. The organic solvents can include acetone, diethyl ether, ethyl acetate, ethanol, petroleum ether and dichloromethane. TDM facilitates the polymerization process and in many embodiments, expedites the polymerization process. The monomer solution with or without TDM is then introduced into the polymerization reactor and mixed, which is maintained at approximately between 64 and 66° C.

A catalyst solution of TBHP and an emulsifier solution comprising a plurality of emulsifiers including KOH and oleic acid can also be introduced into the polymerization reactor. The TBHP serves to initialize the polymerization process. In multiple embodiments of this disclosure, the TBHP solution, the KOH emulsifier solution, and the oleic acid can be added in any order (i.e., it is not necessary that the solution of TBHP and the emulsifier solution of KOH and oleic acid be added in a specific order). The contents of the polymerization reactor can additionally be stirred to mix and/or homogenize such contents by way of a stirrer, a magnetic stirrer or agitator.

Subsequent to the introduction of the catalyst solution and the emulsifier solution, the contents in the polymerization reactor are left to homogenize (e.g., by way of stirring) for multiple hours, for instance, approximately 4-5 hours (e.g., 4.5 hours). Following that, the polymerization reactor temperature is raised to approximately 65 and 75° C., for example 70° C., over a period of approximately 25 to 35 minutes, for example, 30 minutes.

When the polymerization reactor temperature reaches and/or is maintained at approximately 70° C., the reaction or the contents of the polymerization reactor can be maintained in a current, substantially unchanging, or consistent state or left alone for approximately 2.5 and 3.5 hours, for example, 3 hours for one of facilitating and effectuating completion of the polymerization process 120. The polymerization reactor can then be cooled and an intermediate product is obtained.

In many embodiments, the second process portion or the polymerization process 120, produces an intermediate product which is substantially in the form of latex that has been grafted and which includes natural rubber as a constituent. Thus, the intermediate product produced by or obtained from this polymerization process 120 includes grafted natural rubber.

Aspects of a Representative Flocculation Process

Following the polymerization process 120, a flocculation process 130 is performed. As will be understood by a person of ordinary skill in the art, flocculation refers to the separation of a solution. It is a process whereby colloids are formed in a suspension liquid, and during flocculation, fine particles agglomerate or clump together in a floc. The floc can float up or accumulate at the top of the suspension liquid, or settle at the bottom of the suspension liquid. The floc can then be readily separated or harvested by way of a filtration process.

In representative embodiments of this disclosure, the flocculation process 130 includes a portion to produce, harvest or yield a latex masterbatch.

For a flocculation process 130 according to multiple embodiments of this disclosure, a number or set of different starting materials, reagents or reactants can be used. In several embodiments, the set of starting materials, reagents and/or reactants include grafted natural rubber, a set of grafted polybutadiene rubbers, an emulsion resin, a metal deactivator, at least one colour stabilizer, antioxidant and coagulant. In a number of embodiments, the set of grafted polybutadiene rubbers includes at least a first grafted polybutadiene rubber and a second grafted polybutadiene rubber, and possibly additional grafted polybutadiene rubbers. In the following discussion on a representative flocculation process 130 in accordance with an embodiment of the present disclosure, the quantities of the set of starting materials, reagents and/or reactants including grafted natural rubber, a plurality of grafted polybutadiene rubbers, emulsion resin, metal deactivator, at least one colour stabilizer, antioxidant and coagulant are expressed in parts by weight, relative to powdered natural rubber.

In some embodiments, grafted polybutadiene rubbers including small particle-sized grafted polybutadiene rubber (approximately 0.1-0.2 μm) or medium particle-sized grafted polybutadiene rubber (approximately 0.3-0.4 μm) can be used for the flocculation process 130. The first and/or second grafted polybutadiene rubber can be the small particle-sized and/or medium particle-sized grafted polybutadiene rubber. The emulsion resin includes an emulsion mixture of styrene acrylonitrile (E SAN). Additionally, the metal deactivator includes potassium hydroxide (KOH); the at least one colour stabilizer includes tetra sodium pyrophosphate (TSPP), sodium dodecyl sulphate (SDS) and potassium hydroxide (KOH); the antioxidant includes phenolic antioxidants such as Octolite 1219 and Wingstay L phenolic antioxidant; and the coagulant includes a metal sulphate, for example, magnesium sulphate hepta hydrate and/or mixture of magnesium sulphate hepta hydrate ($MgSO_4 \cdot 7H_2O$) and sulphuric acid ($H_2SO_4$).

In representative embodiments of this disclosure, a set of starting materials, reagents or reactants in the flocculation process 130 includes between approximately 10 and 20 parts by weight, for example, approximately 16.4 parts by weight of the grafted natural rubber; between approximately 20 and 30 parts by weight, for example, approximately 24.6 parts by weight of a first grafted polybutadiene rubber; between approximately 35 and 45 parts by weight, for example, approximately 41 parts by weight of a second grafted polybutadiene rubber; between approximately 15 and 25 parts by weight, for example, 18 parts by weight of an emulsion mixture of styrene acrylonitrile (E SAN); between approximately 0.25 and 0.75 parts by weight, for example, 0.5 parts by weight of KOH; between approximately 0.05 and 0.5 parts by weight, for example, 0.1 part by weight of TSPP; approximately 0.05 and 0.5 parts by weight, for example, 0.1 part by weight of SDS; approximately 0.1 and 1 part by weight, for example 0.21 parts by weight, of KOH; between approximately 0.1 and 1 parts by weight, for example, 0.5 parts by weight of Wingstay L phenolic antioxidant; and between approximately 3 and 8 parts by weight, for example, 4.2 parts by weight of $MgSO_4 \cdot 7H_2O$.

The flocculation process portion 130 can be carried out, conducted or performed by way of a set of reactors, for instance, a 20-liter reactor. However, it should be understood for an ordinary person skilled in the art that other reactors of different volumes, shapes and/or sizes can also be used for the flocculation process 130. In some embodiments, a plurality of flocculation reactors including a first flocculation reactor and a second flocculation reactor is used.

The flocculation process 130 detailed below can involve increasing, altering and/or maintaining the temperature(s) of the set of flocculation reactor(s), which can be by way of a heating system in a manner understood by one of ordinary skill in the relevant art (e.g., in a manner identical or analogous to a heating system or element described above).

In accordance with several embodiments of this disclosure, grafted natural rubber from the polymerization process 120 is introduced into a first flocculation reactor which is operating at room temperature, between approximately 20 and 30° C. The grafted natural rubber is substantially in liquid form such as a liquid solution, suspension or emulsion. Depending upon embodiment details, the quantity of the grafted natural rubber can be altered, varied or changed to produce the final product, which includes natural rubber-based powder exhibiting particular characteristics. For instance, a high quantity of the grafted natural rubber yields natural rubber-based powder with high impact strength and high elongation, while a low quantity of such natural rubber yields natural rubber-based powder with high tensile strength and elongation balance.

Thereafter, one or more polybutadiene rubbers are introduced into the first flocculation reactor. For instance, a plurality of polybutadiene rubbers can include a first grafted polybutadiene rubber and a second grafted polybutadiene rubber. The properties and/or quantities of the first and/or second grafted polybutadiene rubber can affect, alter, vary or change the physical characteristics of the resultant natural rubber-based ABS product. For example, increased or high quantity of the first grafted polybutadiene rubber with increased or larger particle size can affect the impact strength of the final product (e.g., gives rise to increased or high impact strength), whereas an increased or high quantity of the second grafted polybutadiene rubber with decreased or smaller particle size can affect the gloss of the final product (e.g., gives rise to increased or high gloss). By varying the properties and/or quantities of the first and/or second grafted polybutadiene rubbers, the properties of the resultant natural rubber-based ABS powder can be altered, varied or changed accordingly. Depending upon the type, properties, and/or quantity of the first and/or second grafted polybutadiene rubber, the properties of the resultant natural rubber-based ABS powder can be altered, varied or changed, for instance, in an intended manner (e.g., suited to a particular product usage environment or application under consideration).

Following the addition of the first grafted polybutadiene rubber and the second grafted polybutadiene rubber; the E SAN, KOH (metal deactivator); the at least one colour stabilizer including at least one of TSPP, SDS and KOH; and the antioxidant(s) are added into the first flocculation reactor. The contents of the first flocculation reactor can be stirred to mix and/or homogenize such contents by way of a stirrer, a magnetic stirrer or agitator.

The KOH (metal deactivator) plays a role in stabilizing fluids by deactivating metal ions and in particular, iron ions in the reaction mixture. Iron ions originate from the reaction between $FeSO_4.7H_2O$ and lactose in the polymerization process and can remain in the reaction mixture. The at least one colour stabilizer play a role in preventing degradation from the presence of the catalyst (TBHP) remaining from the polymerization process, which can result in reaction mixture colour change. The antioxidant(s) are useful for preventing the degradation of the resultant natural rubber-based ABS powder. This can increase the lifespan of the resultant natural rubber-based ABS powder.

It is not necessary to introduce the E SAN, the KOH, the at least one colour stabilizer and the antioxidant in the order described above. For example, the KOH can be added before the E SAN, followed by the antioxidant and the at least one colour stabilizer. In some embodiments, the E SAN, the KOH, the at least one colour stabilizer and the antioxidant can be added into the first flocculation reactor all at the same time. In several embodiments, it takes approximately an hour for the completion of the reaction.

Following the addition of the E SAN, the KOH, the colour stabilizers and the antioxidant, the contents of the first flocculation reactor is maintained at room temperature, for example, between approximately 20° C. and 40° C. for a period of approximately 30 minutes to produce a latex masterbatch. In various embodiments of this disclosure, the latex masterbatch is substantially liquid in nature and can exist as a suspension, gel, emulsion or solution.

Subsequently, between approximately 10 and 15 liters, for example, 12 liters of water is introduced to a second flocculation reactor. The second flocculation reactor operates at room temperature, for example between approximately 20 and 30° C. The water can include at least one of distilled water and de-ionized water. Thereafter, the coagulant including $MgSO_4.7H_2O$ is introduced into the second flocculation reactor before the temperature of the second flocculation reactor is increased to between approximately 90 and 100° C., for example, between approximately 94 and 97° C.

When the second flocculation reactor is maintained at a temperature between approximately 94 and 97° C. for between approximately 10 to 15 minutes, a portion of the latex masterbatch is introduced into the second flocculation reactor. The latex masterbatch can be introduced into the second flocculation reactor at a controlled rate.

During the addition of the latex masterbatch into the second flocculation reactor, the temperature of the second flocculation reactor is maintained between approximately 80 and 90° C., for example, between approximately 84 and 86° C. For instance, a controlled or progressive introduction of the portion of latex masterbatch is carried out while the second flocculation reactor is at a temperature of between approximately 84 and 86° C. Subsequent to the complete addition of the latex masterbatch, the temperature of the second flocculation reactor is increased or altered to between approximately 92 and 94° C. The increased or altered temperature to between approximately 92 and 94° C., facilitates, enables or expedites the flocculation process. A temperature variation prior to, during and/or after the addition of the latex masterbatch can affect the resultant particle size of the final product.

Upon the increment or alteration of the second flocculation reactor temperature to between approximately 92 and 94° C., the second flocculation reactor is maintained between approximately 92 and 94° C. for approximately 15 to 30 minutes for one of facilitating and effectuating completion of the flocculation of the latex masterbatch. By mixing the coagulant and the latex masterbatch, the flocculation reaction occurs in the second flocculation reactor. More specifically, flocculation of the latex masterbatch occurs in the reactor with the aid, help or assistance of the coagulant.

The flocculation process 130 produces, harvests or yields a resultant product, which includes raw natural rubber-based ABS powder. In various embodiments, a resultant particle size of powder is approximately 500 μm. The raw natural rubber-based ABS powder is produced as a suspended substance, product, or powder in water.

Subsequently, the raw natural rubber-based ABS powder is harvested or separated from water and/or any residual unreacted reactants and/or by-products present in the second flocculation reactor. This can be carried out by way of a filtration process where the flocculation process 130 includes filtering the raw natural rubber-based ABS powder. In a representative embodiment, a large-scale filtration apparatus, for example, a conveyor belt is used. This can remove between approximately 40 and 60% of the moisture in the raw natural rubber-based ABS powder.

Following the filtration process, the retenate, residue or filtrand is dried. Drying of the retenate, residue or filtrand can be performed by way of a baking or heating process in an oven, a flash dryer or a tornesh dryer at a temperature of between approximately 70 and 100° C., for example, about 80° C., for a predetermined period of time, for example, approximately 24 hours. The dried retenate, residue or filtrand includes the final product, natural rubber-based ABS powder. The natural rubber-based ABS powder provided by various embodiments of this disclosure will undergo a compounding process to produce products with natural rubber-based ABS powder as a constituent or additive.

The natural rubber-based ABS powder of the embodiments of the present disclosure can be produced or obtained in solid state or form, for example, in powder form. Therefore, the natural rubber-based ABS powder can be easily, more easily or better mixed with other plastic or plastic based powders for manufacturing of producing plastic products. Accordingly, there can be good uniformity or homogeneity between the natural rubber-based ABS powder of many embodiments of this disclosure and other common or conventional plastic or plastic-based powders. This facilitates or allows the natural rubber-based ABS powder to be supplied, used and/or applied with existing plastic or plastic powders. The use of the natural rubber-based ABS powder provided by various embodiments of this disclosure can produce, yield or give rise to plastic products which have increased mechanical strength and/or enhanced physical properties. Natural rubber-based powders in accordance with embodiments of the present disclosure are easy to handle and work with.

To facilitate or give rise to the production of, or yield or produce, plastic products including a natural rubber-based ABS product, the natural rubber-based ABS powder typically undergoes an additional compounding process.

Aspects of a Representative Compounding Process

A compounding process 140 can be carried out in accordance with embodiments of the present disclosure to facilitate or give rise to the production of, or yield or produce, plastic products that include natural rubber-based ABS, such as a plastic product that includes a polycarbonate as well as natural rubber-based ABS. As will be understood by a person of ordinary skill in the art, compounding is the process of mixing various materials, compounds, substances, and/or additives with a set of target, reference, or associate materials, compounds, compositions, or substrates, for example, at least one plastic material such as polycarbonate. Most plastic materials cannot be processed in their post polymerization or flocculation condition. More particularly, post polymerized or flocculated plastic material must be enhanced, for example, with compounding additives for processing. Plastic materials without process additives decompose during processing and produce physically weak products. Compounding of additives plays a significant role in modifying the physical properties, imparting technical advantages and enhancing the performance characteristics of plastic materials in their product application(s). The compounding process 140 facilitates the strengthening of resultant plastic products.

A number or set of different starting materials, reagents or reactants can be used in a compounding process 140 in accordance with the present disclosure. In embodiments relating to a PC/ABS blend of the present disclosure, the set of starting materials, reagents and/or reactants include the natural rubber-based ABS powder, styrene acrylonitrile resin (SAN) and lubricants. In other ABS blends in accordance with embodiments of the present disclosure, materials or polymers such as, but not limited to, nylon, polybutylene terephthalate (PBT), polymethyl methacrylate (PMMA), and polyethylene terephthalate (PET) can replace or be incorporated in addition to polycarbonate as a target, reference, or associate material.

In the following description, the quantities of a set of starting materials, reagents and/or reactants including the natural rubber-based ABS powder, SAN and lubricants are expressed in parts by weight, relative to the ABS powder and the SAN.

The lubricants used in the compounding process 140 include Ethylene bis stearamide (EBS), Calcium stearate (Ca-st) and/or silicone oil (Si-Oil).

In various embodiments, ABS blends in accordance with the present disclosure include between approximately 10-90 parts by weight of natural rubber-based ABS powder, and further include one or more target, reference, or associate polymer based materials (e.g., a polycarbonate material). In several embodiments, the set of starting materials, reagents or reactants includes between approximately 20 and 60 parts by weight, for example, approximately 40 parts by weight, of the natural rubber-based ABS powder; between approximately 40 and 80 parts by weight, for example, approximately 60 parts by weight, of SAN; between approximately 0.2 and 3 parts by weight, for example, approximately 0.5 parts by weight, of EBS; between approximately 0.05 and 2.0 parts by weight, for example, approximately 0.2 parts by weight, of Ca-st; and between approximately 0.01 and 1 part by weight, for example, 0.05 parts by weight, of Si-Oil.

The compounding process 140 can be carried out, conducted or performed in a compounding mixer or extruder, for instance, a Twin screw extruder having a diameter of approximately 26 mm and length to diameter ratio L:D of approximately 40 (e.g., Model: LABTECH LTE26-40/15kW). The compounding mixer or extruder can be fully automated or semi automated.

In several embodiments, the natural rubber-based. ABS powder from the flocculation process 130 is introduced into a compounding mixer or extruder operating at room temperature, between approximately 20 and 40° C. Following the addition of the natural rubber-based ABS powder, the SAN is added into the compounding mixer or extruder before the lubricants such as EBS, Ca-st and Si-Oil are introduced into the compounding mixer or extruder. The lubricants facilitate the compounding process by making the natural rubber-based ABS powder flexible or allowing it to become flexible.

After the introduction of the natural rubber-based ABS powder, the SAN and the lubricants into the compounding mixer or extruder, the contents are mixed. Subsequently, the contents are melted at a temperature of between approximately 190 and 210° C. Thereafter, the melted contents can be used to produce plastic products (e.g., natural rubber-based ABS products) of desired shapes and sizes, for instance, by way of forcing the aforementioned mixed extruder contents through a die. The plastic products include natural rubber-based ABS powder as a constituent. A shape and size of the die determine a shape and size of the plastic products produced. In several embodiments, the shape of the die can correspond to or include generally ellipsoidal or elliptical (e.g., round), rectangular and/or cylindrical portions.

In the description of representative Examples provided hereafter and Tables corresponding thereto, unless explicitly stated otherwise, the recitation of particular numerical values or value ranges is taken to be a recitation of particular approximate numerical values or approximate value ranges.

EXAMPLE 1

A first representative example of preparing a composition including natural rubber-based acrylonitrile butadiene styrene (ABS) in accordance with embodiments of this disclosure is described hereinafter.

A first process is carried out to strengthen natural rubber. This is followed by a second process for producing grafted natural rubber, which exists substantially as a liquid, for example, in the form of latex. A third process produces natural rubber-based ABS powder, before a fourth process forms a plastic product with natural rubber-based ABS as a constituent. The first, second, third and fourth processes can correspond to the vulcanization process 110, the polymerization process 120, the flocculation process 130 and the compounding process 140 described in this disclosure.

Reactants, reagents or starting materials corresponding to the first process are presented in Table 1 below. The quantity of the reactants, reagents or starting materials in Table 1 is presented in parts by weight, relative to pre vulcanized rubber.

An emulsifier—catalyst mixture is first prepared. The emulsifiers include KOH and oleic acid, and the catalyst includes TBHP. The emulsifiers include 0.2 parts by weight of KOH and 0.85 parts by weight of oleic acid. The catalyst includes 2 parts by weight of TBHP. The TBHP is added to a mixture of KOH and oleic acid and left to stir at room temperature using a stirrer.

Following that, the first process is performed in a 20 liter reactor by introducing 5% by volume of the prepared emulsifier—catalyst mixture into the reactor, which is operating at room temperature. Natural rubber of 100 parts by weight (100%) is added into the reactor and the reaction is left to stir. A crosslinking agent and three deoxidants are introduced to the reaction mixture. The cross linking agent includes 0.5 parts by weight of DVB. The deoxidants include 0.28 parts by weight of lactose, 0.004 parts by weight of $FeSO_4.7H_2O$ and 0.16 parts by weight of TSPP. The temperature of the reactor is then increased to 70° C. over a period of 30 minutes.

While the temperature of the reactor is maintained at 70° C., the remaining portion of the mixture of emulsifier and catalyst is introduced into the reactor over a period of 1 hour. Thereafter the reaction mixture is left to stir for 7 hours.

The reactor is then cooled. The first process produced an intermediate product or vulcanized natural rubber.

A second process follows the first process described above. Reactants, reagents or starting materials corresponding to the second process are detailed in Table 2 below. The quantity of the reactants, reagents or starting materials in Table 2 is presented in parts by weight, relative to natural rubber grafted latex with styrene and acrylonitrile copolymer.

The second process begins with introducing 60% of vulcanized natural rubber into a 20-liter polymerization reactor operating at room temperature. The vulcanized rubber is left to stir in the reactor using a stirrer. A stabilizer is then introduced into the reactor. The stabilizer includes 0.6 parts per hundred resin (phr) of ammonium hydroxide ($NH_4OH$) at 3-15% concentration. After the addition of $NH_4OH$, the reactor temperature is increased to 65° C. The increment of the temperature is carried out over a period of 30 minutes. When the temperature is maintained at 65° C., 3 deoxidants are introduced into the reactor. The deoxidants include 0.3 parts by weight of lactose, 0.001 parts by weight of $FeSO_4.7H_2O$ and 0.1 parts by weight of TSPP.

Monomer solution of styrene and acrylonitrile is then added into the reactor together with a transfer agent such as tert-dodecylmercaptan (TDM). The monomer solution includes 30% styrene, 10% acrylonitrile and 0.2 parts by weight of TDM. Following that, a catalyst solution and an emulsifier solution are introduced into the reactor. The catalyst solution is 0.136 parts by weight of TBHP, which is supplied as a 69-70% aqueous solution. The emulsifier solution includes 0.203 parts by weight of KOH and 1 part by weight of oleic acid.

Thereafter, the reaction mixture is left to stir at 4.5 hours at 65° C. before the reactor temperature is increased to 70° C. over 30 minutes. While the reactor temperature is maintained at 70° C., the reaction mixture is left to stir for 3 hours to complete the second process. The second process produces an intermediate product that has natural rubber as a constituent. The intermediate product includes grafted natural rubber.

A third process follows the second process. Reactants, reagents or starting materials corresponding to the third process are summarized in Table 3. The quantity of the reactants, reagents or starting materials of an embodiment of the third process is presented in Table 3 in parts by weight, relative to powdered natural rubber.

Various combinations of grafted rubbers in accordance with embodiments of the present disclosure exhibit a predetermined, intentionally selected, preferentially defined, or programmably determined/specified multimodal particle size distribution that includes, incorporates, or results in multiple distinguishable (e.g., readily distinguishable or significantly different) average or median particle sizes, such as a trimodal particle size distribution corresponding to three distinct or readily distinguishable particle sizes (e.g., having distinct particle spans or diameters that differ by at least approximately 20% in size relative to each other).

In several embodiments, the third process involves the creation of a latex masterbatch by way of combining or mixing a grafted natural rubber having a first particle size with at least one grafted polybutadiene rubber having a particle size that is significantly or substantially different than that of the grafted natural rubber. A number of embodiments in accordance with the present disclosure involve mixing a grafted natural rubber having a first particle size with a plurality of grafted synthetic rubbers including a first grafted polybutadiene rubber and a second grafted polybutadiene rubber, where the particle size of the grafted natural rubber, the particle size of the first grafted polybutadiene rubber, and the particle size of the second grafted polybutadiene rubber are distinct or readily distinguishable from each other.

An embodiment of the third process starts by creating a latex masterbatch, which involves adding 16.4% of a grafted natural rubber of a large particle size such as 0.8 to 1.0 micron into a flocculation reactor operating at room temperature. Following that, 24.6% of a grafted polybutadiene rubber of, for example, a small particle size of 0.2 micron, and 41% of a third grafted polybutadiene rubber of, for example, a medium or intermediate particle size of 0.4 micron, are added into the reactor.

The aforementioned small particle size can be correlated with or correspond to a predetermined percentage of the large particle size. Additionally, in embodiments that include one or more particle sizes intermediate between the small particle size and the large particle size, a given intermediate particle size can be correlated with or correspond to a predetermined over-unity percentage of the small particle size, a predetermined under-unity percentage of the large particle size, or a predetermined difference between the small particle size and the large particle size. For instance, depending upon embodiment details, the small particle size can be 20%-90% smaller than the large particle size, or stated equivalently, 10%-80% of the large particle size (e.g., 20%-25%, 40%-50%, or 60%-75% of the large particle size). Additionally, the medium or intermediate particle size can be 20%-80% less than the large particle size and at least 20% greater (e.g., 50%-400%, or 100%, 150%, 200%, 250%, or more, depending upon embodiment details) than the small particle size; or the medium or intermediate particle size can exceed the small particle size by 15%-85% (e.g., 25%-75%, or 50%) of a difference between the small particle size and the large particle size.

Subsequently, 18% of an emulsion mixture of styrene acrylonitrile is introduced into the reactor. The reaction is left to stir using a stirrer. Afterwards, a metal deactivator, three colour stabilizers and an antioxidant are introduced to the reaction mixture. The metal deactivator includes 0.5 parts by weight of KOH, the colour stabilizers include 0.1 parts by weight of TSPP, 0.1 parts by weight of SDS and 0.21 parts by weight of KOH and the antioxidant includes 0.5 parts by weight of Wingstay L phenolic antioxidant. Upon allowing the reaction mixture to rest for approximately 30 minutes, latex masterbatch is produced or obtained.

Subsequently, 12 liters of de-ionized water is introduced to a separate 20-liter reactor operating at room temperature. A coagulant, $MgSO_4 \cdot 7H_2O$ is then introduced into this reactor. The coagulant includes 4.2 parts by weight of $MgSO_4 \cdot 7H_2O$. The temperature of the reactor is then increased to 95° C. and maintained at a temperature of 85° C. before a portion, approximately 9 liters of the latex masterbatch is added to the reactor. The temperature of the reactor is then increased to between approximately 92 to 94° C. and then left for approximately 30 minutes to complete the third process. The third process produces natural rubber-based ABS powder.

A filtration process can be performed for separating or harvesting the natural rubber-based ABS powder from the residual reactants and/or impurities still present in the reactor. The natural rubber-based ABS powder is then dried in an oven at approximately 80° C. for 24 hours.

A fourth process can follow the filtration process. The fourth process is employed to convert raw polymer or base to polymer resin using a twin screw extruder. Various embodiments of the fourth process involve producing a plastic resin that includes at least one type of polycarbonate as well as natural rubber-based ABS.

Reactants, reagents or starting materials for embodiments of the fourth process are summarized in Tables 4, 5, 6 and 7. The quantity of the reactants, reagents or starting materials in Table 4, 5, 6 and 7 is presented in parts by weight, relative to the ABS powder and the SAN. Tables 4a, 5a, 6a and 7a summarise the physical properties of each of the corresponding Examples 2-18 presented in Tables 4, 5, 6 and 7 respectively.

An embodiment of the fourth process, as shown by Example 4, is initiated by introducing a given weight (e.g., 70 parts by weight) of a polycarbonate and a given weight (e.g., 15 parts by weight) of the dried natural rubber-based ABS powder into a mixer vessel at room temperature. Then, a given weight (e.g., 15 parts by weight) of SAN is introduced into the mixer vessel. This is followed by adding lubricants into the mixer vessel. The lubricants include 0.5 parts by weight of EBS, 0.2 parts by weight of Ca-st and 0.05 parts by weight of Si-Oil. The ABS powder, SAN, polycarbonate and the lubricants are mixed using a low speed mixer for 5 minutes until well mixed before the mixture is fed to a twin screw extruder for compounding and pelletizing.

A twin screw extruder having a of 26 mm diameter and length to diameter ratio L:D of 40 is used for the compounding process. The temperature profile and compounding conditions of the twin screw extruder are shown in Table 8.

Various compositions in accordance with the present disclosure include:

A) 60 to 80 parts of polycarbonate and/or other polymer based material by weight;
B) Natural rubber-based ABS that is made from natural rubber at 15 to 30 parts by weight;
C) Co-polymers of styrene and acrylonitrile at 5 to 25 parts by weight;
D) EBS at 0.5 parts per 100 parts of polymer;
E) Silicone oil at 0.05 parts per 100 parts of polymer; and
F) Ca-st at 0.2 parts per 100 parts of polymer.

TABLE 1

Reactants, reagents or starting materials for the first process

| Reactants/reagents/starting materials | Quantity |
|---|---|
| Emulsifier - potassium hydroxide (KOH) | 0.2 parts by weight |
| Emulsifier - oleic acid | 0.85 parts by weight |
| Catalyst - tert-Butyl hydroperoxide (TBHP) | 2 parts by weight |
| Natural rubber | 100% |
| Crosslinking agent - divinylbenzene (DVB) | 0.5 parts by weight |
| Deoxidant - lactose | 0.28 parts by weight |
| Deoxidant - hepta hydrated iron sulphate ($FeSO_4 \cdot 7H_2O$) | 0.004 parts by weight |
| Deoxidant - tetra sodium pyrophosphate (TSPP) | 0.16 parts by weight |

TABLE 2

Reactants, reagents or starting materials for the second process

| Reactants/reagents/starting materials | Quantity |
|---|---|
| Vulcanized natural rubber | 60% |
| Stabilizer - ammonium hydroxide ($NH_4OH$) 3-15% concentration | 0.6 parts by weight |
| Deoxidant - lactose | 0.3 parts by weight |
| Deoxidant - hepta hydrated iron sulphate ($FeSO_4 \cdot 7H_2O$) | 0.001 parts by weight |
| Deoxidant - tetra sodium pyrophosphate (TSPP) | 0.1 parts by weight |
| Monomer - styrene | 30% |
| Monomer - acrylonitrile | 10% |
| Transfer agent - tert-dodecylmercaptan (TDM) | 0.2 parts by weight |
| Catalyst - tert-Butyl hydroperoxide (TBHP) 69-70% aqueous solution | 0.136 parts by weight |
| Emulsifier - potassium hydroxide (KOH) | 0.203 parts by weight |
| Emulsifier - oleic acid | 1 parts by weight |

TABLE 3

Reactants for the third process

| Reactants/reagents/starting materials | Quantity |
|---|---|
| Grafted natural rubber (particle size: 0.8-1.0 micron) | 16.4% |
| First polybutadiene rubber (particle size: 0.2 micron) | 24.6% |
| Second polybutadiene rubber (particle size: 0.4 micron) | 41% |
| Styrene Acrylonitrile emulsion mixture (ESAN) | 18% |
| Metal deactivator - potassium hydroxide (KOH) | 0.5 parts by weight |
| Colour stabilizer - tetra sodium pyrophosphate (TSPP) | 0.1 parts by weight |
| Colour stabilizer - sodium dodecyl sulphate (SDS) | 0.1 parts by weight |
| Colour stabilizer - potassium hydroxide (KOH) | 0.21 parts by weight |
| Antioxidant - | 0.5 parts by weight |
| Coagulant - magnesium sulphate hepta hydrate ($MgSO_4 \cdot 7H_2O$) | 4.2 parts by weight |

TABLE 4

Reactants for Examples 2-6 in the fourth process

| Components | Quantity (parts weight basis) | | | | |
|---|---|---|---|---|---|
| Polymers | 2 | 3 | 4 | 5 | 6 |
| ABS having Natural rubber | 15 | 15 | 15 | 15 | 15 |
| Polycarbonate (PC) | 60 | 65 | 70 | 75 | 80 |
| Copolymer of styrene and acrylonitrile | 25 | 20 | 15 | 10 | 5 |

TABLE 4-continued

Reactants for Examples 2-6 in the fourth process

| Additives | Quantity (parts per 100 parts of polymers) | | | | |
|---|---|---|---|---|---|
| Ethylene-bis-stearamide as a mixing aid agent | 0.5 | 0.5 | 0.5 | 0.5 | 0.5 |
| Silicone oil lubricant | 0.05 | 0.05 | 0.05 | 0.05 | 0.05 |
| Calcium-stearate as a mixing aid agent | 0.2 | 0.2 | 0.2 | 0.2 | 0.2 |

TABLE 4a

Physical Properties of PC/ABS thermoplastic resins of Examples 2-6

| Physical properties | Unit | 2 | 3 | 4 | 5 | 6 | Analytical method |
|---|---|---|---|---|---|---|---|
| Melt flow index(220 C./10 kg) | g./10 min | 14.9 | 16.8 | 15.8 | 12.4 | 12.1 | ASTM D-1238 |
| Izod Impact | Kg-cm/cm$^2$ | 12.3 | 17.0 | 35.3 | 45.7 | 45.3 | ASTM D-256 |
| Hardness | R-Scale | 120 | 119 | 118 | 114 | 118 | ASTM D-785 |
| Tensile Strength | Kg/cm$^2$ | 562 | 544 | 532 | 548 | 539 | ASTM D-638 |
| Elongation | % | 56 | 37 | 69 | 76 | 76 | ASTM D-638 |
| Flexural Strength | Kg/cm$^2$ | 806 | 776 | 756 | 762 | 730 | ASTM D-790 |
| Flexural Modulus | *10$^{-4}$ Kg/cm$^2$ | 2.48 | 2.36 | 2.28 | 2.21 | 2.11 | ASTM D-790 |
| Heat distortion temperature (HDT) | Celsius | 100.1 | 104.9 | 104.9 | 108.5 | 112.9 | ASTM D-648 |

TABLE 5

Reactants for Examples 7-11 in the fourth process

| Components | Quantity (parts weight basis) | | | | |
|---|---|---|---|---|---|
| Polymers | 7 | 8 | 9 | 10 | 11 |
| ABS having natural rubber | 20 | 20 | 20 | 20 | 20 |
| Polycarbonate | 60 | 65 | 70 | 75 | 80 |
| Copolymer of styrene and acrylonitrile | 20 | 15 | 10 | 5 | — |
| Additives | Quantity (parts per 100 parts of polymers) | | | | |
| Ethylene-bis-stearamide | 0.5 | 0.5 | 0.5 | 0.5 | 0.5 |
| Silicone oil lubricant | 0.05 | 0.05 | 0.05 | 0.05 | 0.05 |
| Calcium-stearate | 0.2 | 0.2 | 0.2 | 0.2 | 0.2 |

TABLE 5a

Physical Properties of PC/ABS thermoplastic resins of Examples 7-11

| Physical properties | Unit | 7 | 8 | 9 | 10 | 11 | Analytical method |
|---|---|---|---|---|---|---|---|
| Melt flow index(220 C./10 kg) | g./10 min | 12.2 | 16.2 | 15.0 | 12.4 | 14.5 | ASTM D-1238 |
| Izod Impact | Kg-cm/cm$^2$ | 34.6 | 48.2 | 40.7 | 43.0 | 44.0 | ASTM D-256 |
| Hardness | R-Scale | 117 | 116 | 117 | 117 | 117 | ASTM D-785 |
| Tensile Strength | Kg/cm$^2$ | 520 | 504 | 483 | 515 | 551 | ASTM D-638 |
| Elongation | % | 61 | 50 | 48 | 75 | 84 | ASTM D-638 |
| Flexural Strength | Kg/cm$^2$ | 731 | 715 | 704 | 699 | 682 | ASTM D-790 |

TABLE 5a-continued

Physical Properties of PC/ABS thermoplastic resins of Examples 7-11

| Physical properties | Unit | 7 | 8 | 9 | 10 | 11 | Analytical method |
|---|---|---|---|---|---|---|---|
| Flexural Modulus | $*10^{-4}$ Kg/cm$^2$ | 2.26 | 2.19 | 2.13 | 2.05 | 1.98 | ASTM D-790 |
| Heat distortion temperature (HDT) | Celsius | 103.0 | 105.2 | 107.0 | 111.3 | 113.4 | ASTM D-648 |

TABLE 6

Reactants for Examples 12-15 in the fourth process

| Components | Quantity (parts weight basis) | | | |
|---|---|---|---|---|
| Polymers | 12 | 13 | 14 | 15 |
| ABS having Natural Rubber | 25 | 25 | 25 | 25 |
| Polycarbonate | 60 | 65 | 70 | 75 |
| Copolymer of styrene and acrylonitrile | 15 | 10 | 5 | — |
| Additives | Quantity (parts per 100 parts of polymers) | | | |
| Ethylene-bis-stearamide | 0.5 | 0.5 | 0.5 | 0.5 |
| Silicone oil lubricant | 0.05 | 0.05 | 0.05 | 0.05 |
| Calcium-stearate | 0.2 | 0.2 | 0.2 | 0.2 |

TABLE 6a

Physical Properties of PC/ABS thermoplastic resins of Examples 12-15

| Physical properties | Unit | 12 | 13 | 14 | 15 | Analytical Method |
|---|---|---|---|---|---|---|
| Melt flow index (220 C./10 kg) | g./10 min | 11.2 | 16.8 | 9.2 | 17.1 | ASTM D-1238 |
| Izod Impact | Kg-cm/cm$^2$ | 43.9 | 51.5 | 47.9 | 41.4 | ASTM D-256 |
| Hardness | R-Scale | 115 | 113 | 113 | 114 | ASTM D-785 |
| Tensile Strength | Kg/cm$^2$ | 512 | 534 | 484 | 481 | ASTM D-638 |
| Elongation | % | 73 | 78 | 68 | 73 | ASTM D-638 |
| Flexural Strength | Kg/cm$^2$ | 684 | 657 | 646 | 639 | ASTM D-790 |
| Flexural Modulus | $*10^{-4}$ Kg/cm$^2$ | 2.12 | 2.02 | 1.94 | 1.87 | ASTM D-790 |
| Heat distortion temperature (HDT) | Celsius | 104.8 | 106.2 | 108.5 | 109.4 | ASTM D-648 |

TABLE 7

Reactants for Examples 16-18 in the fourth process

| Components | Quantity (parts weight basis) | | |
|---|---|---|---|
| Polymers | 16 | 17 | 18 |
| Natural rubber-based ABS | 30 | 30 | 30 |
| Polycarbonate | 60 | 65 | 70 |
| Copolymer of styrene and acrylonitrile | 10 | 5 | — |
| Additives | Quantity (parts per 100 parts of polymers) | | |
| Ethylene-bis-stearamide | 0.5 | 0.5 | 0.5 |
| Silicone oil lubricant | 0.05 | 0.05 | 0.05 |
| Calcium-stearate | 0.2 | 0.2 | 0.2 |

TABLE 7a

Physical Properties of PC/ABS thermoplastic resins of Examples 16-18

| Physical properties | Unit | 16 | 17 | 18 | Analytical method |
|---|---|---|---|---|---|
| Melt flow index(220 C./10 kg) | g./10 min | 7.9 | 6.2 | 5.5 | ASTM D-1238 |
| Izod Impact | Kg-cm/cm$^2$ | 45.1 | 48.0 | 49.0 | ASTM D-256 |
| Hardness | R- Scale | 110 | 110 | 110 | ASTM D-785 |
| Tensile Strength | Kg/cm$^2$ | 447 | 470 | 444 | ASTM D-638 |
| Elongation | % | 60 | 67 | 58 | ASTM D-638 |
| Flexural Strength | Kg/cm$^2$ | 618 | 619 | 590 | ASTM D-790 |
| Flexural Modulus | $*10^{-4}$ Kg/cm$^2$ | 1.93 | 1.88 | 1.79 | ASTM D-790 |
| Heat distortion temperature (HDT) | Celsius | 105.3 | 107.4 | 110.1 | ASTM D-648 |

TABLE 8

| Compounding conditions of twin screw extruder | | |
| --- | --- | --- |
| Conditions | Values | Unit |
| Temperature | Zone 1-3: 190<br>Zone 4-8: 200<br>Zone 9-10: 210 | ° C. |
| Screw speed (main screw) | 225-275 | Rpm |
| Cutter speed | 10-16 | rpm |
| Output | 5-10 | Kg./hrs. |

The invention claimed is:

1. A process for producing a composition including a set of polymers and a natural rubber-based acrylonitrile butadiene styrene (ABS) powder, the process comprising:
   (a) producing the natural rubber-based ABS powder comprising:
      (i) mixing a crosslinking agent with a portion of natural rubber to produce vulcanized natural rubber;
      (ii) mixing the vulcanized natural rubber with a monomer solution comprising styrene and acrylonitrile to produce grafted natural rubber having a grafted natural rubber particle diameter; and
      (iii) mixing the grafted natural rubber with a set of grafted polybutadiene rubbers to produce a latex masterbatch, the grafted natural rubber having a particle diameter corresponding to a large particle diameter, the set of grafted polybutadiene rubbers comprising a first grafted polybutadiene rubber having a first grafted polybutadiene rubber particle diameter and a second grafted polybutadiene rubber having a second grafted polybutadiene rubber particle diameter,
      wherein the first grafted polybutadiene rubber has a small particle diameter and the second grafted polybutadiene rubber has a medium particle diameter,
      wherein the small particle diameter is between 20%-90% smaller than the large particle diameter and the medium particle diameter exceeds the small particle diameter by between 15% and 85% of a difference between the large particle diameter and the small particle diameter, and
   (b) combining the natural rubber-based ABS powder with the set of polymers.

2. The process of claim 1, wherein the large particle diameter is between 0.7 and 1.1 microns, the small particle diameter is between 0.15 and 0.25 microns, and the medium particle diameter is between 0.35 and 0.45 microns.

3. The process of claim 1, wherein the set of polymers includes at least one of polycarbonate, nylon, polybutylene terephthalate (PBT), polymethyl methacrylate (PMMA), and polyethylene terephthalate (PET).

4. The process of claim 1, further comprising manufacturing a plastic product that includes the composition.

5. The process of claim 1, wherein combining the natural rubber-based ABS powder with the set of polymers comprises mixing the natural rubber-based ABS powder with the set of polymers in a compounding reactor.

6. The process of claim 5, wherein the compounding reactor includes an extruder.

7. A composition including a set of polymers and a natural rubber-based (ABS) powder created by a process comprising:
   (a) producing the natural rubber-based ABS powder comprising:
      (i) mixing a crosslinking agent with a portion of natural rubber to produce vulcanized natural rubber;
      (ii) mixing the vulcanized natural rubber with a monomer solution comprising styrene and acrylonitrile to produce grafted natural rubber having a grafted natural rubber particle diameter; and
      (iii) mixing the grafted natural rubber with a set of grafted polybutadiene rubbers to produce a latex masterbatch, the grafted natural rubber having a particle diameter corresponding to a large particle diameter, the set of grafted polybutadiene rubbers comprising a first grafted polybutadiene rubber having a first grafted polybutadiene rubber particle diameter and a second grafted polybutadiene rubber having a second grafted polybutadiene rubber particle diameter,
      wherein the first grafted polybutadiene rubber has a small particle diameter and the second grafted polybutadiene rubber has a medium particle diameter,
      wherein the small particle diameter is between 20%-90% smaller than the large particle diameter and the medium particle diameter exceeds the small particle diameter by between 15% and 85% of a difference between the large particle diameter and the small particle diameter, and
   (b) combining the natural rubber-based ABS powder with the set of polymers.

8. The composition of claim 7, wherein the set of polymers includes at least one of polycarbonate, nylon, polybutylene terephthalate (PBT), polymethyl methacrylate (PMMA), and polyethylene terephthalate (PET).

9. The composition of claim 7, wherein the large particle diameter is between 0.7 and 1.1 microns, the small particle diameter is between 0.15 and 0.25 microns, and the medium particle diameter is between 0.35 and 0.45 microns.

10. The composition of claim 7, wherein the portion of natural rubber includes between 90 and 100 parts by weight of natural rubber.

11. The composition of claim 7, wherein mixing the crosslinking agent with the natural rubber comprises mixing between 0.1 and 1.0 parts by weight of the crossslinking agent with the natural rubber.

12. The composition of claim 7, wherein the crosslinking agent includes one of divinyl benzene (DVB) and an organic peroxide.

13. The composition of claim 7, wherein the monomer solution includes between 25 and 35 parts per weight of styrene and between 5 and 15 parts by weight of acrylonitrile.

14. The composition of claim 7, wherein mixing the grafted natural rubber with the set of grafted polybutadiene rubbers is carried out in a first flocculation reactor.

15. The composition of claim 7, wherein producing the natural rubber-based ABS powder further comprises mixing a coagulant with the latex masterbatch to produce the natural rubber-based ABS powder.

16. The composition of claim 15, wherein mixing the coagulant with the latex masterbatch is carried out in a second flocculation reactor.

* * * * *